Nov. 16, 1965   A. G. BODINE, JR   3,217,551
VIBRATION GENERATOR FOR RESONANT LOADS AND SONIC
SYSTEMS EMBODYING SAME
Filed March 21, 1962   4 Sheets-Sheet 1

INVENTOR.
ALBERT G. BODINE JR.
BY Lilly & Nyhagen
ATTORNEYS

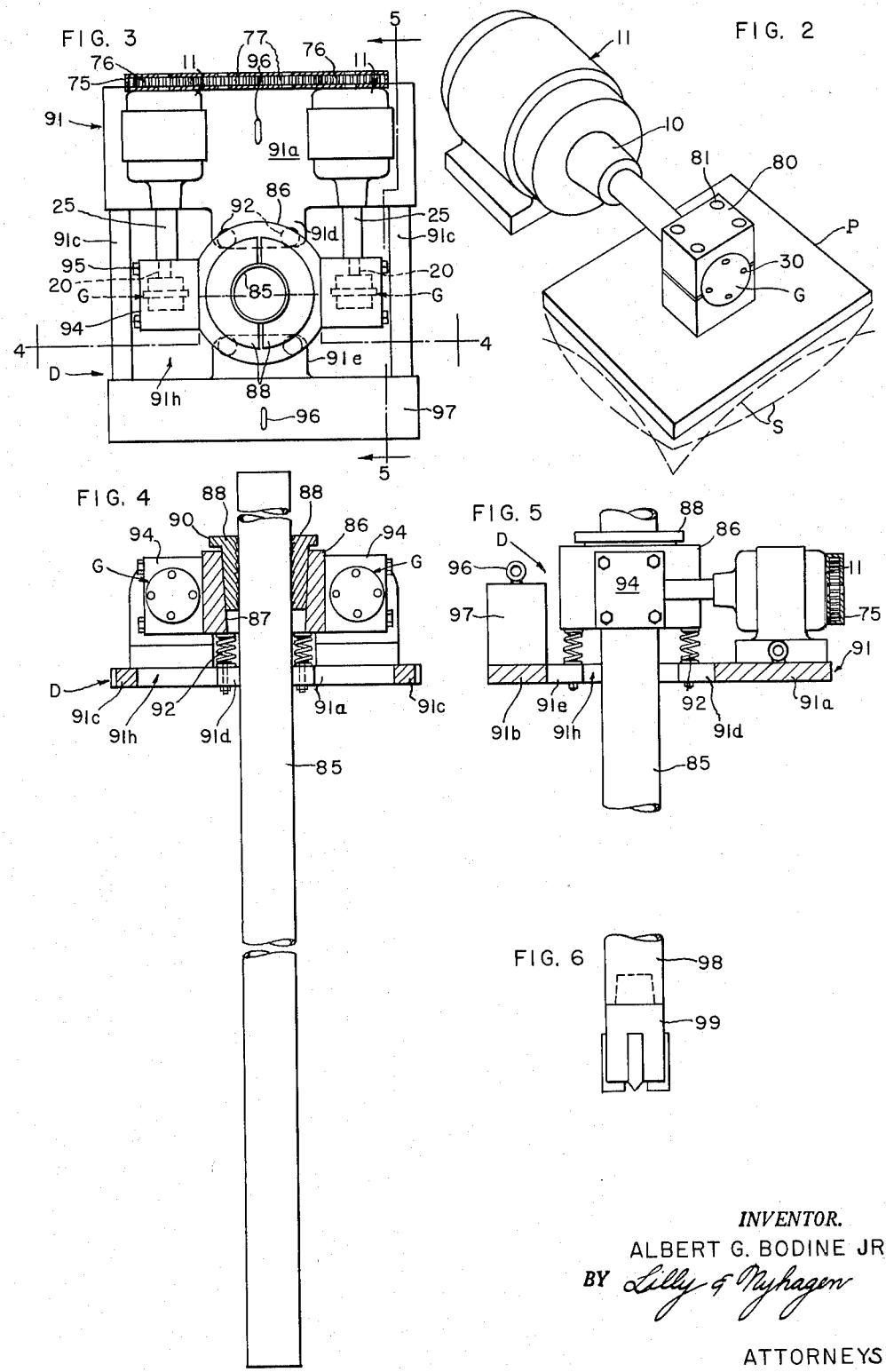

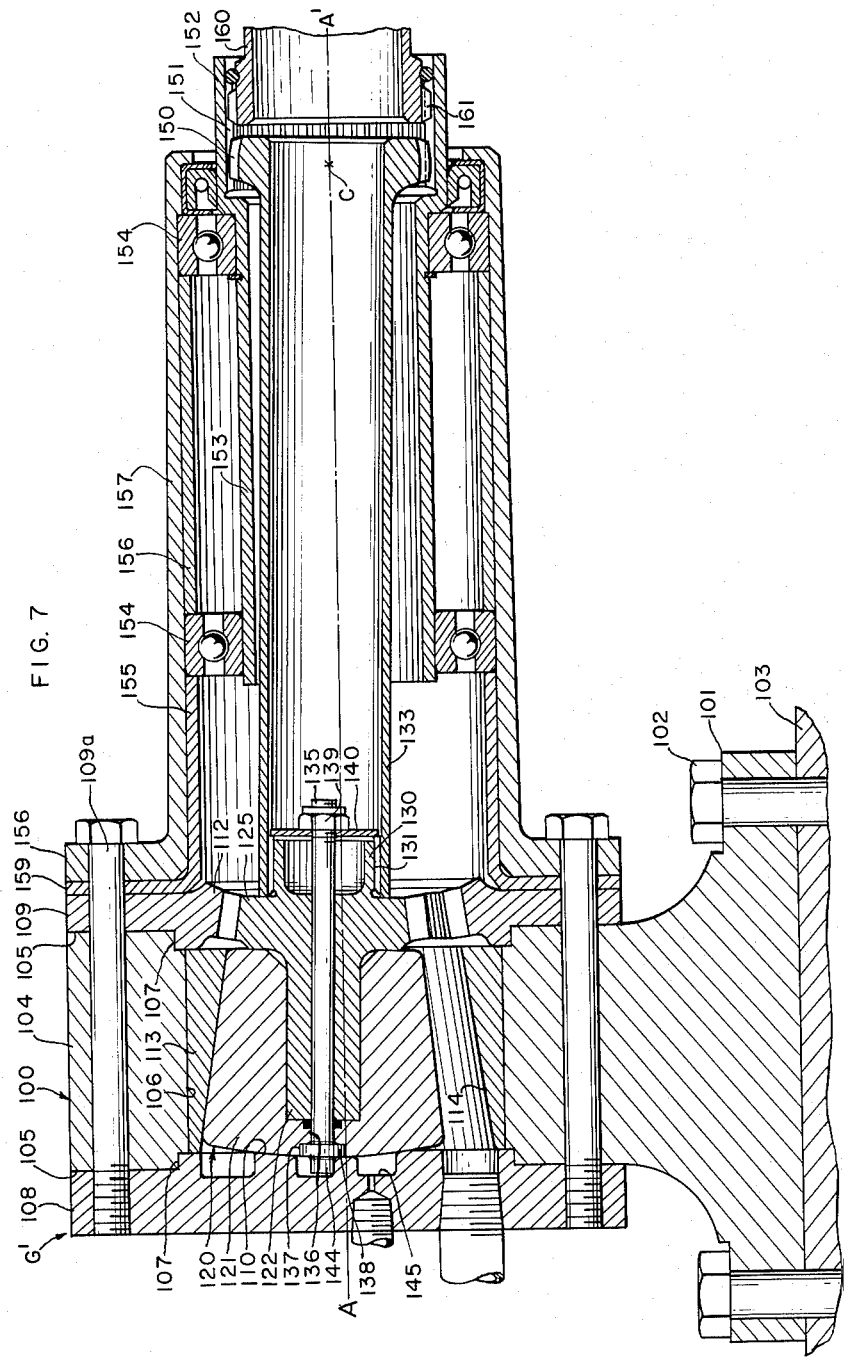

Nov. 16, 1965  A. G. BODINE, JR  3,217,551
VIBRATION GENERATOR FOR RESONANT LOADS AND SONIC
SYSTEMS EMBODYING SAME
Filed March 21, 1962  4 Sheets-Sheet 4

INVENTOR.
ALBERT G. BODINE JR.
BY
ATTORNEYS

United States Patent Office 3,217,551
Patented Nov. 16, 1965

3,217,551
VIBRATION GENERATOR FOR RESONANT LOADS
AND SONIC SYSTEMS EMBODYING SAME
Albert G. Bodine, Jr., Los Angeles, Calif.
(7877 Woodley Ave., Van Nuys, Calif.)
Filed Mar. 21, 1962, Ser. No. 181,385
7 Claims. (Cl. 74—87)

This invention relates generally to vibration generators, especially for setting up vibrations in resonant load devices, and particularly in various forms of industrial vibratory machinery.

A large number of vibration generators for such purposes have been proposed in the past, such as unbalanced flywheels, gyratory balls and other forms of rollers, some of these being shaft driven, others by streams of air under pressure, and the like. Each of these, and many others unmentioned herein, has its place and use, depending upon impulse required and the frequency at which the generator is to operate. However, many of these have problems and limitations, such as undue bearing loads, some of which are aggravated when driving loads in a resonant frequency range of the load, or of a transmission means between the generator and load.

A general object of the invention is accordingly the provision of a novel and improved vibration generator, of low to moderate frequency range adaptability, that is to say, of the general order of from around 20 to a few thousand c.p.s., and one which is capable of operation with relatively high power output, or impulse, such as is useful in such industrial applications as sonic well drills, sonic pile drivers, sonic pumps, sonic wave radiators for industrial applications, or underwater signaling, etc.

The generator of the present invention is, very broadly speaking, of that class of vibrators having a gyratory inertia roller which rolls around the inside of a circular raceway in an orbital path. The present invention uses, correspondingly, an inertia roller rolling in an orbital path around the inside of a raceway in a suitable bearing, so as to exert a centrifugal-force bearing load on the bearing. The roller may be driven in its orbital path, for example, by a drive shaft containing a pair of universal joints, so that the drive shaft can describe a conical motion path without flexure. This drive shaft, or whatever torque-applying means is actually utilized in practice, is connected to a "planet" gear, which is coaxial with the inertia roller, and is joined thereto. The planet gear is rotatable relative to the inertia roller on their common axis, and the pitch diameter of the planet gear is equal to the outside diameter of the inertia roller. The planet gear meshes with a larger diameter internal stationary gear fixed co-axially with the raceway. The inertia roller is guided to roll about the raceway in an orbital path, and by reason of centrifugal force, exerts a radial force, with a constantly rotating force vector, on the raceway. The roller gains traction with the raceway, particularly in starting, owing to the meshing of the planet gear with the internal gear. However, the capability for relative rotation between the roller and planet gear permits the roller to turn relatively to the planet gear to accommodate whatever differential rotation may tend to occur therebetween. It will be appreciated, in this connection, that the planet gear, driven positively in its orbital path, will rotate at a rate governed by the meshing of the planet gear with the stationary gear, while the inertia rotor tends to rotate at a rate governed by its traction with the raceway. In practice, these rates usually will not be identical. The importance of the provided capability for relative rotation between the planet gear and the inertia roller will thus be apparent. It will also be seen that the bearing pressure of the inertia roller is borne by the raceway, and not by the gear teeth.

The raceway is placed inside a relatively heavy housing body or frame, which constitutes the vibratory output means of the generator, and which is coupled to whatever load device is to receive the generated vibrations.

The vibration generator of the invention is especially adapted for use in setting up and maintaining vibrations in predetermined modes and patterns at resonant frequencies in load or transmission members. Such members, vibrating strongly at resonance, tend to back-react on the vibration generator, and sometimes cause it to behave in an irregular manner, and it is a feature of the invention that such back reactions do not tend to introduce irregularities in the operation of the generator.

Among the illustrative applications of the invention disclosed hereinafter are a sonic pile driver, a sonic drill, and a radiator for radiating sound waves within a body of liquid.

Attention is particularly drawn to the sonic pile driver and sonic drill applications, which present certain important features of invention over and beyond those embodied in the vibration generators per se, as will become apparent as the description proceeds.

Reference is now directed to the accompanying drawings, in which:

FIG. 2 is a perspective view of an application of the generator of FIG. 1 to the vibration of a plate;

FIG. 3 is a plan view of a pile driving machine using generators illustratively of the nature of those shown in FIG. 1;

FIG. 4 is a section taken on broken line 4—4 of FIG. 3;

FIG. 5 is a section taken on broken line 5—5 of FIG. 3;

FIG. 6 shows a lower fragmentary portion of a drill pipe and a drill bit connected thereto, such as may be driven by a driving system in the nature of that shown in FIGS. 3 and 5;

FIG. 7 is a view similar to FIG. 1 but showing a modification;

Figure 1:
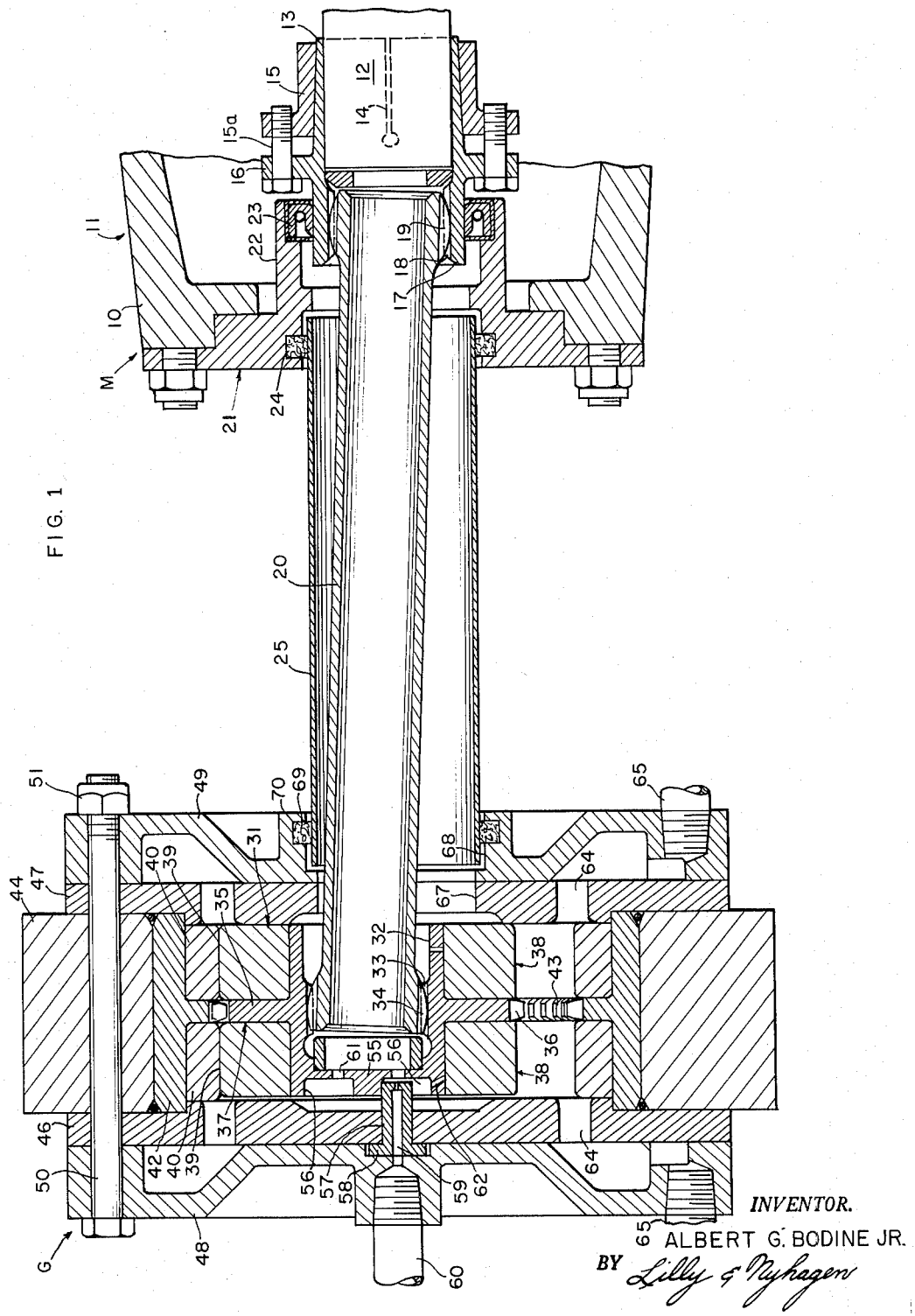
FIG. 1 is a longitudinal medial sectional view through a vibration generator, and drive means therefor, in accordance with the invention, a portion of the drive means, of a conventional nature, being broken away.

With reference first to FIG. 1 of the drawings, an illustrative vibration generator is shown at G, and an illustrative drive means for the generator is shown at M. The latter will be described first. Numeral 10 designates generally the front end portion of the housing of a drive motor 11 only fragmentarily illustrated in said figure, and numeral 12 designates the motor drive shaft. The motor 11 may be a variable speed motor drive unit, of a well-known type containing adjustable means for varying the speed of the drive shaft of the motor. since the details of such devices are well known, they need not be described herein. A tapered sleeve 13, split as at 14 to permit radial contraction, fits on the end of motor shaft 12, and is adapted to be contracted by means of an internally tapered collet 15 drawn up by screws 15a extending through a flange 16 of sleeve 13. The sleeve 13 is thus tightly clamped to shaft 12. Extending forwardly from sleeve 13, outwardly of flange 16, is a sleeve portion 17 formed with internal splines 18, and engaged with the latter are arcuately formed splines 19 formed on the adjacent end of a tubular drive shaft 20, whereby the drive shaft 20 may rock or turn through a substantial conical angle with reference to the central longitudinal axis of drive shaft 12. The splined coupling described is simply a universal joint of special form. An adaptor 21 is secured to the forward end portion 10 of the motor and has an inwardly extending sleeve portion 22 carrying a seal 23 for the outside of sleeve member 17, and carrying also a yieldable packing ring 24 engageable with the outside of a housing tube 25 which surrounds the drive shaft 20.

The vibration generator G is positioned coaxially with the drive shaft 12 of motor 11, and is spaced axially therefrom, as shown. Embodied in this vibration generator G is an orbital inertia rotor 31. An inner drive sleeve 32 of this rotor 31 is formed medially on its inside surface with splines 33 which are engaged by arcuate splines 34 on the corresponding extremity of drive shaft 20.

The sleeve 32 has an external medial flange 35 formed at its periphery with spur gear teeth 36, and which forms a planet gear 37. Rotatably mounted on sleeve 32, on opposite sides of gear 37, are two heavy inertia rings or rollers 38. The inertia rollers 38 have cylindric faces 39 laterally opposite planet gear teeth 36, and of the same diameter as the pitch circle of the planet gear, and these cylindric faces bear and have traction on the interior cylindric surfaces of a pair of hardened raceway rings or bearings 40, of somewhat larger internal diameter than the external diameter of the rollers 38, for example, in approximately the proportions shown in FIG. 1. In this particular embodiment of the invention, therefore, the inertia roller is actually made up of two inertia roller rings or elements on opposite sides of the planet gear.

Raceway rings 40 are seated tightly inside a stationary gear sleeve 42, on opposite sides of a stationary internal ring gear 43 formed in said sleeve and which meshes with the aforementioned planet gear 37.

Gear sleeve 42 is mounted inside a relatively heavy side wall or housing ring 44. Engaging opposite ends of ring 44 are side plates 46 and 47, which form the side walls of a cylindrical raceway cavity for the rotor 31, the dimensions being such that the rotor is fairly closely confined by the side plates 46 and 47, but is freely rotatable therebetween. Cover plates 48 and 49 engage the side plates 46 and 47, and the ring 44, side plates 46 and 47 and cover plates 48 and 49 are interconnected and drawn together by bolts 50 passing therethrough and nuts 51, thus completing a housing for the generator, as clearly shown in FIG. 1.

The rotor 31 is guided to maintain its gear 37 in proper mesh with the gear 43, and so that its inertia rollers 38 roll, in an orbital motion, around the raceway rings 40, the surfaces of the inertia rings 38 pressed by centrifugal force against the inside surfaces of the rings 40. To this end, the left hand end of rotor sleeve 32, as viewed in FIG. 1, is formed with an end wall 55 provided, concentrically with the rotor axis, with an annular channel 56, and a guide pin 57 extending from the adjacent side plate 46, coaxially with bearings 40, projects into said channel 56, adjacent the inner peripheral wall thereof, as shown. The gear teeth 36 are by this means held in mesh with the ring gear 43 when the generator is at rest, or is coming up to speed. When the generator is up to speed, the rollers 38 press firmly against the raceway rings 40 by virtue of centrifugal force, and the gears remain in proper mesh without further aid from the pin and channel. As here shown, the pin 57 projects from a disk 58 seated in a suitable cavity in cover plate 48, and is bored, as at 59, to conduct lubricant supplied by an oil line 60. Such lubricant is conveyed into channel 56, passes partly through oil holes 61 formed in wall 55, and partly around the lefthand side of the rotor, to find its way to the various working surfaces, including the gear teeth and splines as described hereinabove. Ports 62 lead the lubricant to the interior bearing surfaces for the rollers 38. This lubricant is discharged finally as by way of ports 64 in side plates 46 and 47, and discharge lines 65 screwed into cover plates 48 and 49, all as clearly represented in FIG. 1.

As shown, side plate 47 is centrally apertured, as at 67, so as to accommodate the conically gyratory drive shaft 20, and cover plate 49 is formed with a central aperture 68 to accommodate both drive shaft 20 and the housing tube 25, a packing ring 69 being set into a groove 70 sunk into aperture 68, so as to yieldingly engage housing tube 25.

The oscillator will be seen to comprise two primary elements, first, the orbital rotor 31, and second, a body or body assembly comprised of bearings 40, gear sleeve 42, ring 44, and the side plates 46 and 47 and cover plates 48 and 49. This body assembly may be coupled in any suitable or desired manner to whatever load is to be vibrated, and such coupling may be accomplished by means of a housing closely surrounding the oscillator body, by bolts or screws, or otherwise, such as will be more particularly referred to hereinafter.

In operation, rotation of motor drive shaft 12 rotates drive shaft 20, which in turn rotates rotor sleeve 32 as well as the planet gear 37 formed thereon. The arcuate splines on the two ends of drive shaft 20, in mesh at one end with the splined coupling tube 17, and at the other with the splines inside rotor sleeve 32, act as universal joints, and permit the shaft 20 to move in a conical gyratory fashion as the rotor 31, driven by the tube 20, moves through its orbital path defined by raceway rings 40. In such motion, the rotor gear 37 rolls on the internal gear 43, with the bearing load, however, taken by the raceway rings 40 contacted by the inertia rings 38 of the rotor. In other words, the shaft driven rotor travels in an orbital path, with its gear 37 in mesh with gear 43, and its inertia rings 38 bearing by reason of centrifugal force against the inside surfaces of raceway rings 40. When operating speed has been attained, the inertia rings 38 tend to rotate without skid on the raceway rings 40. The inertia rings 38, however, are capable of any necessary degree of rotation on the cylindrical bearing surfaces afforded by the outside of rotor sleeve 32. In operation, therefore, the rotor gear 37 rolls orbitally about the stationary gear 43, and the inertia rings 38 correspondingly roll about the surfaces of raceway rings 40; and when the device is up to speed, little if any slippage occurs between rotor rings 38 and the raceway rings 40, but some minor relative rotation may occur between inertia rings 38 and the rotor hub or sleeve 32. This novel arrangement places the bearing stress of the inertia rings 38 against the hardened race rings 40 and relieves the gear teeth of such stress, while at the same time permitting a degree of relative rotation between the inertia rings 38 and the gear 37 so as to avoid the exertion of undue torque on the gear teeth.

FIG. 2 shows one illustrative application of the generator of FIG. 1, in this instance to the setting up of a standing wave pattern in a heavy plate P. The motor 11 is shown driving the generator 30 of FIG. 1, and the latter is to be understood as closely enclosed by a tight fitting housing 80 which is securely fastened, as by screws 81, to the aforementioned plate P. The generator is driven by motor 11 at a resonant standing wave frequency of the plate P, causing a standing wave vibration pattern to appear in the plate, as represented at s.

FIGS. 3, 4 and 5 illustrate the generator of the invention applied to a sonic pile driving system. The theory underlying sonic pile drivers of the class at hand is disclosed in my earlier Patent No. 2,975,846 The sonic pile driver D disclosed in FIGS. 3, 4 and 5, and which is shown as utilizing the vibration generator of FIG. 1, incorporates certain additional features of invention, as will be described presently. Numeral 85 designates generally a tubular steel pile which is to be driven into the ground. It may be say 60 feet long, or may be longer, and may be open at its lower end, or capped, in accordance with conventional pile driver practice. Receiving this pile with annular clearance, is a ring frame 86 of the driver D, provided with a tapered bore 87. Serrated wedge slips 88 slide into the tapered clearance space between the wall of bore 87 and the pile 85, and are driven down, so that the serrations are wedged into positive driving engagement with the pile. Flanges 90 on the wedge slips afford shoulders by which the wedge slips may be engaged and lifted when the pile is to be released.

A relatively heavy platform 91 is suspended from ring frame 86 by means of tension springs 92. This platform comprises two spaced, coplanar plates 91a and 91b, connected by side bars 91c, and two inward projections 91d and 91e from plates 91a and 91b, to which the supporting rings 92 are connected, and which underlie opposite side portions of ring frame 86. The platform 91 is open between the plates 91a and 91b, inside the side bars 91c, as indicated at 91h, to accommodate the pile and to afford desirable work room. The platform supports a pair of variable speed drive motors 11, each corresponding to the variable speed drive motor 11 of FIG. 1. Each of these drive motors 11 drives a vibration generator G, illustratively the generator G of FIG. 1, whose housing is tightly encased in an exterior box on housing 94, and the two housings 94 are secured as by studs 95 to opposite sides or ring frame 86. It will be seen that the two motors 11 are arranged to one side of ring frame 86, and on parallel axes, and that the generators G are correspondingly on parallel axes. The drive motors 11 and platform 91 afford a certain degree of important downward bias loading of the pile; and to increase this loading, and at the same time balance motors 11, a bias loading mass 97 is mounted on platform 91 on the side opposite from the motors 11.

The two vibration generator drive motors 11 are arranged and adjusted to drive at synchronous speeds, and in opposite directions. The orbital rotors 31 of the two generators G accordingly traverse their orbital paths in opposite directions; and also the rotors 31 are phased, by initial positioning of their planet gears 37 relative to the stationary ring gears 43, such that they move through their vertical components of travel in step with one another, and through their lateral or horizontal components of travel in opposition to one another. Therefore, the components of vertical oscillating force exerted by the rotors on the generator race rings are additive, and are transmitted to the bodies or housings of the two generators, and thence through the enclosing boxes or housings 94 to the ring frame 86. The horizontal components of oscillating force exerted by the two rotors, on the other hand, are equal and opposed, and hence cancel one another within the ring frame 86.

The described phasing of the two drive motors tends to be preserved as originally set owing to a tendency of the vertically vibrating ring frame to back-react on the generator rotors in a way such as to keep them synchronized with one another. However, I may positively interconnect the drive shafts of the two rotors in proper phase by a set of gears in a back gear box 75, containing spur gears 76 on the rearward ends of the motor shafts, and a pair of intermeshing idler spur gears 77 which mesh with the two gears 76.

The vertical force so applied to the ring frame is an alternating vertical force, which is applied from the ring frame 86 through the pile coupling means constituted by the wedge slips to the pile 85. The pile is thereby set into vertical vibration, of the type set forth in my aforesaid prior application. The vibration generators G will be seen to vibrate with the pile. The motor units 11, however, as well as the entire platform 91, including bias load 97, stand virtually stationary, being isolated from the vibration of the ring frame 86 and generators G by virtue of the considerable mass of this assembly of parts, in combination with the tension springs 92 by which these parts are suspended from the ring frame. Reference back to FIG. 1 will reveal that the drive shaft 20 describes a gyratory path at its oscillator drive end, but has no vertical vibration at the point of its splined coupling to the motor shaft. The shaft housing tube 25 will be seen from FIG. 1 to be flexibly supported at both ends, so as to accommodate vibratory or gyratory motion of the generator without transmission of such motion back to the motor 11.

If the pile is relatively short, or of more or less standard length, say around 60' in length, it is quite feasible to hoist the sonic pile driving machine D to a position to which the pile can be introduced into the platform opening 91h and ring frame 86 from below. Conventional hoisting equipment may be used for elevating the sonic machine, which may comprise a suitable sling, not shown, attached to eyes 96 secured to the machine D, and raised, for example, by block and tackle gear and a suitable boom, not shown. The pile may then be elevated by any suitable or conventional hoisting means, and its upper end introduced into a ring frame 86. The wedge slips may then be set with the sonic machine located at any desired position along the pile, for example, at its upper extremity in some cases or, at its mid-point in others, or in other positions as desired.

Alternatively, for the case of the extra long pile, or when tall hoisting equipment is not available, or for some other reason is not to be used, the pile can be raised into an elevated position preliminarily, with its lower end raised above ground level. The sonic pile driving machine D can then be placed under the pile, and raised around it to desired height, where it may be locked or coupled to the pile by the slips 88.

If the pile driving machine is coupled, by the wedge slips, in some region in the vicinity of the lower or the upper extremity of the pile, the vertical alternating force application to the pile from the pile driving machine sets up a resonant standing wave vibration pattern in the pile which is in general like that disclosed in my aforementioned Patent No. 2,975,846. Resonance is obtained by adjusting the variable speed drive motor units 11 to correspond to the frequency for resonance in the pile. If the pile driving machine is on the other hand coupled to or near the mid-point of the pile, the wave length of the standing wave pattern is halved, and the resonant frequency doubled. The variable drive motor units are then adjusted for this higher frequency. At certain other critical coupling points of the driving machine to the pile, different frequencies are required for resonant vibration, and adjustment is made correspondingly, as will be understood.

The provision of means by which the sonic pile driving machine can be coupled to the pile at any point along the pile affords considerable additional freedom for management of unusual situations, such as those calling for extra long piles, and in general, wherever the hoisting equipment for the pile driver has too short a vertical range of operation for the length of the pile to be driven.

The vibration generator of FIG. 1 and the driving equipment of FIGS. 3–5 may also be applied to the field of sonic earth boring, particularly for relatively shallow wells, say up to 100 feet or so in depth. It is only necessary, for this purpose, to dimension the machine of FIGS. 3–5 for the handling of drill pipe instead of pile tubing, and to equip the lower end of the drill pipe with a suitable bit. In FIG. 6, I have shown, fragmentarily, a lower end portion of a drill pipe 98, to which is coupled a suitable rock bit 99. This drill pipe 98 will be understood to be the lower extremity of a drill pipe string, made up conventionally of lengths of drill pipe coupled to one another in the usual fashion, which is gradually lengthened by adding lengths of drill pipe as the well bore is deepened. The apparatus of FIGS. 3–5, taken together with FIG. 6, is fully illustrative of such a drilling system when it is assumed that the drill pipe 98 of FIG. 6 replaces the pile 85 of FIGS. 2–5. In operation of such a drilling system, the vibration generators G send elastic waves down the drill pipe 98, causing vertical vibration of the bit 99 against the formation to be penetrated. The vertical vibration of the bit on the formation causes the latter to be broken into fragments through fatigue failure. Usual circulation fluid can be pumped down the drill pipe 98 and out through the usual discharge ports in the bit, in the manner conventional in well drilling.

Reference is next directed to FIG. 7, showing a modified vibration generator in accordance with the invention. The generator, designated generally by reference character G', embodies a frame or body part 100, formed with a base 101 adapted to be fastened, as by screws 102, to the device 103 which is to be vibrated. The body 100 has an upstanding part 104, formed with parallel end faces 105, and a central bore 106. Counter bores 107 are formed at the ends of bore 106. End plates 108 and 109 engage end faces 105, and are fastened thereagainst by means of machine screws 109a. End plate 108 projects into the adjacent counterbore 107, and is formed with a concave bearing surface 110, formed on a radius about a center point C located on the longitudinal axis A-A' of the generator. This surface forms a bearing for the opposed convex end surface of the presently described inertia rotor.

The opposite end plate 109 also has a portion projecting inwardly into the adjacent counterbore 107, and is formed inside thereof with a stationary bevel ring gear 112.

Tightly mounted inside bore 106 is a hardened race ring or bearing 113, having a tapered bore forming a conical bearing surface 114, the tapered bore, projected, having its apex at C.

A conical inertia rotor 120 is provided, comprised of a conical roller 121 rotatably mounted on a bearing sleeve 112, of which, projected, converge to the before-mentioned center point C. Conical roller 121 is of a smaller central angle than the tapered or conical bearing surface 114, for example, as shown in the drawing, so as to be capable of travel in an orbital path as it rolls around tapered bearing surface 114. The large end of the conical roller has a convex bearing surface 123, centered about point C, which bears against the concave bearing surface 110.

The bearing sleeve 122 on which conical roller 121 is rotatably mounted projects axially from a bevel planet gear 125 positioned adjacent the small end of roller 121, and which meshes with the aforementioned bevel ring gear 112. The "pitch cone" of the bevel gear conforms to or coincides with the cone defined by the roller 121. The angles of the bevel gears 112 and 125 also converge to the center point C. It will be understood that bevel planet gear 125 rolls around bevel ring gear 112, in proper mesh therewith as conical inertia roller 121 rolls around conical bearing face 114, with roller 121 gaining traction on surface 114 as the generator comes up to speed, and operation stabilizes. Roller 121 turns to any necessary degree relative to gear 125 as the generator initially comes up to speed, or owing to minor differences in the rate of rotation of gear 125 and the roller 121 as produced by traction with ring gear 112 and conical bearing surface 114, respectively.

Projecting axially from bevel gear 125 is a tubular extension 130, which is provided with a splined connection 131 to a conically gyratory tubular drive shaft 133.

Roller 121 is held in assembly with gear 125 by means of a spindle 135 which extends axially through tubular bearing 122 and freely through a bore 136 in the large end portion of roller 121, the bore 136 being counterbored, as at 137, to receive an annular flange 138 on spindle 135. The opposite end portion of spindle 135 is threaded to receive a lock nut 139, which engages a washer 140 positioned adjacent the extremity of tubular gear extension 130, the washer 140, as here shown, engaging the ends of the splines in the drive tube 133. Sufficient play is provided to prevent binding of roller 121 on spindle 135 or tubular bearing 122.

Projecting axially from spindle 135, outside of disk 138, is a guide pin 144 which projects into an annular groove 145 formed in the arcuate end face 110 of end wall 108, concentric with axis A-A'. In a manner analogous with the embodiment of FIG. 1, roller 121 is thereby positioned closely adjacent or in substantial rolling contact with conical raceway 114, and gear 125 is at the same time maintained in proper mesh with gear 112. When the vibration generator is up to speed, centrifugal force urges roller 121 radially outward against conical bearing surface 114, and relieves the pressure of pin 144 on the adjacent side wall of groove 145. At such time, the roller 132 has been able to gain substantially non-skid traction with the bearing surface 114, and gear 125 rolls in proper mesh with gear 112, the roller 121 and gear 125 thus describing orbital paths about the bearing surface 114 and gear 112, respectively. During this action, a small relative rotation or creep is permitted between the roller 121 and gear 125, so as to relieve the gear teeth of strain that might occur if the roller 121 were fixed thereto and were to tend to roll on its raceway at a speed slightly different from that of the gear 125.

The driven extremity of tubular drive shaft 133 is formed with arcuate splines 150, which engage internal splines 151 in a coupling sleeve 152, thus affording a universal joint. The coupling sleeve 152 has a tubular extension 153, of reduced diameter, which is supported by bearings 154 mounted between spacers 155 and 156 within a housing tube 157. The latter is flanged, as at 158, for engagement by assembly screws 110; and spacer 155 is similarly flanged, as at 159, for a corresponding purpose.

Coupling sleeve 152 may be driven in any suitable manner. As here shown, a tubular drive shaft 160, understood to extend from any suitable prime mover, preferably incorporating a variable speed drive, not shown, has splines 161 drivingly engaging the splines 151 in tube 152.

It will be understood from the foregoing description how the conical inertia rotor 121 and gear 125 follow an orbital path about conical raceway 114 and the bevel gear 112 when the tubular drive shaft 133 is rotated. The tubular drive shaft 133 is provided, in effect, with a universal joint action at the point of the splined connection 150, 151, such that the shaft 133 gyrates through a conical angle as the roller 121 and gear 125 traverse their orbital paths.

The centrifugal force exerted by the inertia roller 121 on the bearing member 113 is transmitted to the body or housing ring 102, and thence to the member 103 to which body member 104 is secured. Used singly, such a generator as disclosed in FIG. 7 exerts a gyratory force of vibration on the member 103. Used in pairs, with synchronized and phased drive, as explained in connection with FIGS. 3–5, a linear alternating force may be generated and applied to a load.

Figure 8:
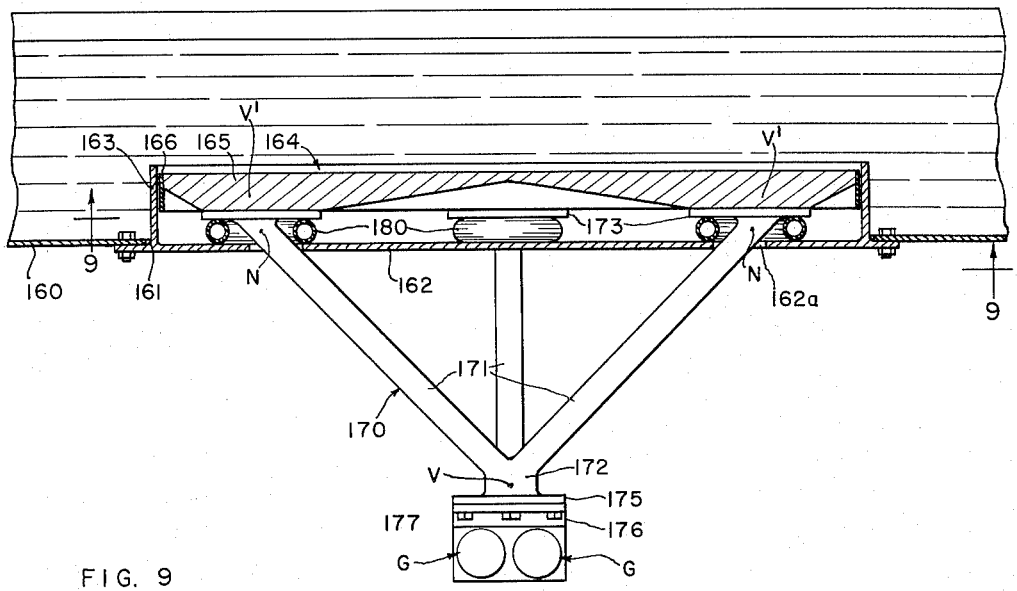
FIG. 8 is a somewhat diagrammatic vertical section taken through a tank and showing amends in accordance with the invention using generators typically of the nature of those shown in FIG. 1, for generating sonic waves in the liquid contents of the tank.
Figure 9:
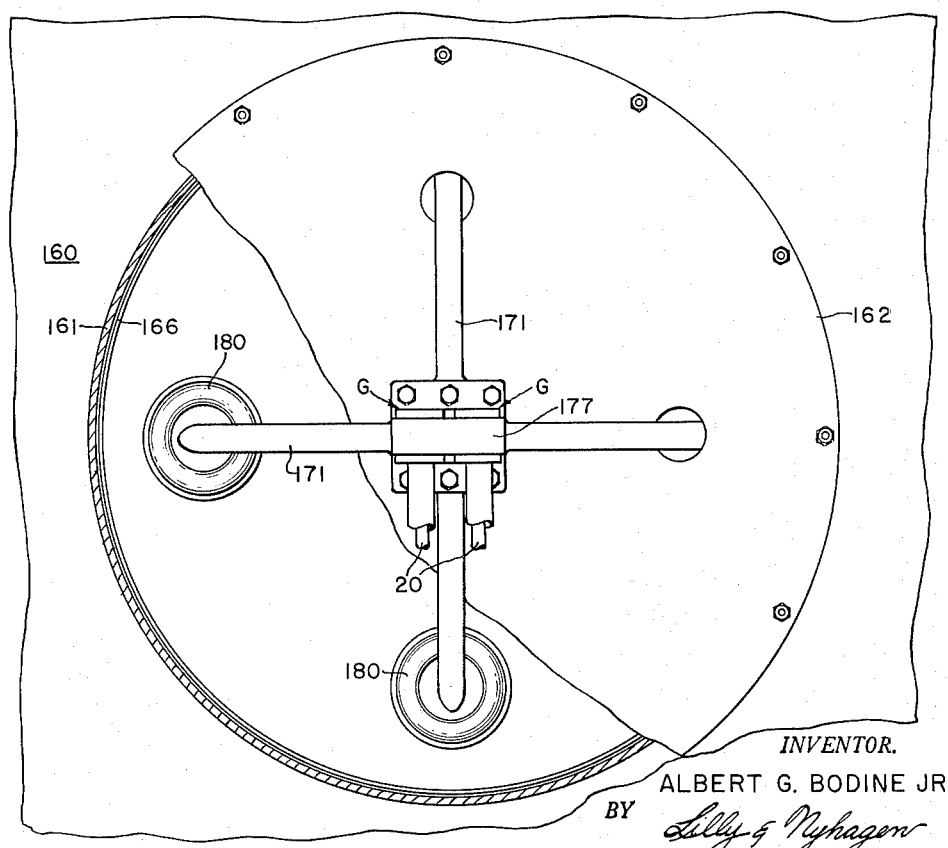
FIG. 9 is a view taken in accordance with broken section line 9—9 of FIG. 8.

In FIGS. 8 and 9 I have shown a system for radiating relatively high power acoustic waves into a body of liquid, and the purpose can be industrial processing of a liquid, cleaning or other treatment of articles within the liquid, clean-out of the tank holding the liquid, underwater signalling, etc.

A tank 160 has an opening 161, closed by a closure plate 162, which is furnished with an inwardly projecting cylinder 163. A close-fitting piston 164 vibrates through a small amplitude in this cylinder 163. As here shown, the piston 164 comprises a relatively heavy, round, sound-wave-radiator plate 165, and a cylindric rim 166 on plate 165 affording a narrow gap, of high acoustic impedance, for the annular liquid body between it and the cylinder 163.

A vibratory bar structure 170 is provided, and transmits vibratory motion from a pair of vibration generators G to the plate 164. The generators G may be of the nature of those shown in FIG. 1, may be used in combination as described in connection with FIGS. 3–5, so as to produce a resultant alternating force along a direction line perpendicular to the radiator plate 165.

As here shown, the bar structure 170 comprises four elastic bars 171, typically steel, having a common juncture at 172, adjacent the generators G, and diverging from said generators to flanges 173 at their opposite ends which are secured in any suitable fashion to the underside of the radiator plate 165. The flanges 173 preferably engage the plate 165 well out from the center thereof, as illustrated. The bars 171 pass through apertures 162a in plate 162. The bar juncture 172 terminates in a plate or flange 175, to which is secured, as by screws 176, a mounting fixture 177 which tightly embraces the two generators G, holding them side by side. The drive shafts 20 for the two generators appear in FIG. 9, and will be understood to be driven from motor units, not shown, but such as indicated more particularly in FIGS. 1–5, and which may be supported in proper position by any suitable support means, also not shown.

Positioned around the bars 171, between and in contact with the flanges 173 and the plate 162, are inflated rubber tubes 180, which may be of cord construction, like a tire. These afford resilient or air cushion support for the plate 165, act as liquid seals around the bar apertures 162a through the plate 162, and also function to acoustically "decouple" the back side of the plate 165 from the liquid. Their function in this connection is to absorb the pressure wave tending to be generated by the back side of the plate.

The bar structure 170 between the vibration generating means and the radiator plate vibrates with a characteristic standing wave pattern when the frequency of operation approaches the resonant frequency for the system. The frequency of the generators G is set at a value to produce a characteristic standing wave behavior in the bar system, with a velocity antinode V of the system (region of large vibratory displacement and velocity) at the end of the bar system adjacent the generators, another velocity antinode V', at the radiator plate 165, and with a node N, or region of minimized vibration, in each of the bars near the plate 165. The nodes N are located near the plate because of the large mass of the latter. A discussion of the phenomena here involved is contained in my co-pending applications Serial No. 9,349 and 68,804. Suffice it to say here that such a system provides a strong and powerful vibratory drive for the radiator plate, and a powerful acoustic wave radiated from the plate.

It was mentioned that the gap between the rim of the radiator plate and the cylinder 163 is narrow, and of high acoustic impedance. For example, for a plate 165, of the order of 60″ in diameter, driven at a frequency of the order of 1000 c.p.s., the gap in question should be of the order of ⅛″ wide by 5″ high. This narrow gap provides two benefits. With a free or open gap around the edge of the radiator plate, the sound waves generated particularly by the peripheral region of the plate 165 travels around the edge of the plate between the front and back side thereof, and arrives in time to cancel a large portion of the wave of opposite phase radiated from the opposite side of the plate in each case. Such "dipole" action is substantially extinguished by the use of the narrow, high-impedance gap. The narrow, high-impedance gap also prevents the desired wave from the front side of the radiator plate from running around to the back side thereof, where it can be largely cancelled or absorbed by the decoupler tubes. The narrow gap thus assures full radiation from the front side of the plate; and assuming a plate of large diameter for the length of the wave being radiated, say one wavelength in diameter, a powerful acoustic beam may be delivered.

One inherent advantage of the class of vibration generator of which those disclosed herein are members is a step-up in frequency from the shaft of the drive motor to the orbiting frequency of the rotor, and therefore the frequency of vibration output. Taking the generator of FIG. 1, for example, it will be seen that each interia rotor 31 has a diameter less than that of its raceway or bearing 40, but greater than the radius of said bearing. Having these relations, each time the rotor rolls completely around the inside of the bearing, it revolves only a part of a complete turn on its own axis. The closer the rotor diameter approaches the bearing diameter, the greater will be the number of orbital trips of the rotor around the bearing for each complete revolution of the rotor on its own axis. Therefore, for each revolution of the motor shaft on its axis, the rotor can be caused to roll many times around the inside of the bearing. An inherent step-up in frequency is thus attained.

Several forms and applications of the invention have now been described and illustrated. It will of course be understood that these are for illustrative purposes only, and that various changes in design, structure and arrangement, as well as numerous applications unmentioned herein may be resorted to without departing from the spirit and scope of the appended claims.

I claim:
1. In a vibration generator, the combination of:
generator body means;
a bearing on said body means providing an internal raceway;
a rotor adapted for orbital travel around said raceway;
said rotor comprising an inertia roller adapted to roll on said raceway, and a planet gear coaxial therewith and rotatable relatively thereto on their common axis;
a ring gear on said body in mesh with said planet gear;
means for guiding said rotor to maintain said planet and ring gears in mesh with one another; and
means for rotating said planet gear on its axis.

2. The subject matter of claim 1, wherein said means for guiding said rotor embodies:
means forming an annular channel, and
means forming a guide pin received in said annular channel,
one of said means being on an end of said rotor and being coaxial therewith,
the other of said means being on said generator body means and being coaxial with said raceway;
said annular channel having an inner defining wall which is in guiding engagement with said pin, so as to maintain said planet gear in mesh with said ring gear.

3. The subject matter of claim 1, wherein said inertia roller and said raceway have cylindric bearing faces in rolling interengagement.

4. The subject matter of claim 1, wherein said inertia roller and said raceway have conical bearing faces in interengagement with one another.

5. The subject matter of claim 4, wherein the planet and ring gears are bevel gears.

6. The subject matter of claim 5, wherein the means for rotating the planet gear comprises a shaft coupled thereto in coaxial relation therewith,
and drive means including a universal joint for rotating said shaft.

7. In a vibration generator, the combination of:
generator body means;
a bearing on said body means providing an internal raceway;
a rotor adapted for orbital travel around said raceway, said rotor comprising,
a gear sleeve,
a medial flange fixed on said gear sleeve and formed to comprise a planet gear, and
an inertia roller rotatably mounted on said gear sleeve and adapted to roll on said raceway;
a ring gear on said body in mesh with said planet gear;

means for guiding said rotor to maintain said planet and ring gears in mesh with one another; and means for rotating said planet gear on its axis.

References Cited by the Examiner

UNITED STATES PATENTS

| | | | |
|---|---|---|---|
| 2,198,148 | 4/1940 | Baily | 74—87 X |
| 2,204,472 | 6/1940 | Caquot | 74—87 X |
| 2,437,983 | 3/1948 | Wenander | 74—87 X |
| 2,730,176 | 1/1956 | Herbold | 74—87 X |
| 2,761,079 | 8/1956 | Giertz-Hedstrom | 310—82 |
| 2,851,889 | 9/1958 | Damond | 74—87 |
| 2,916,265 | 12/1959 | Towne | 259—1 |
| 2,942,427 | 6/1960 | Berthet et al. | 175—55 |
| 2,990,022 | 6/1961 | Muller et al. | 175—55 |
| 3,036,471 | 5/1962 | Peterson | 74—87 |
| 3,056,589 | 10/1962 | Daniel | 259—1 |

BROUGHTON G. DURHAM, *Primary Examiner.*

CHARLES E. O'CONNELL, *Examiner.*